United States Patent Office 3,533,712
Patented Oct. 13, 1970

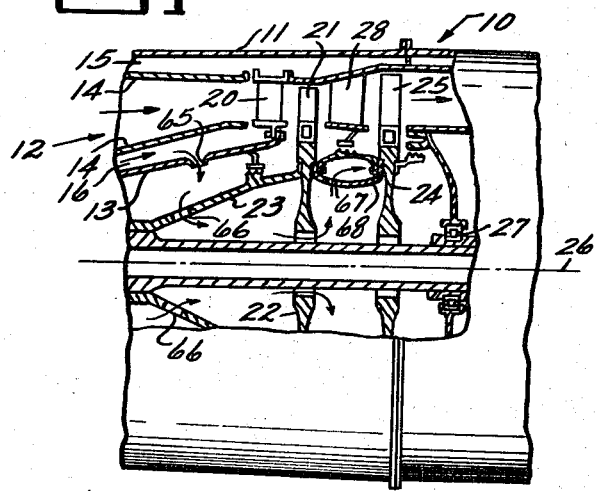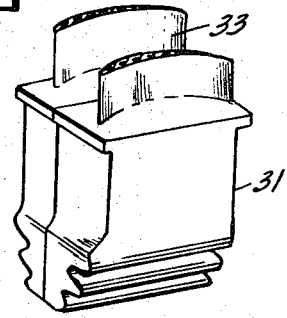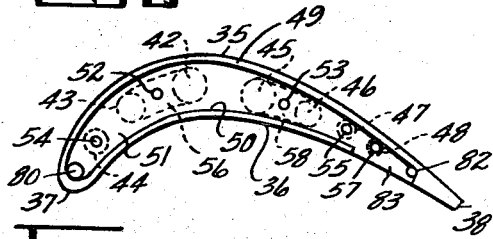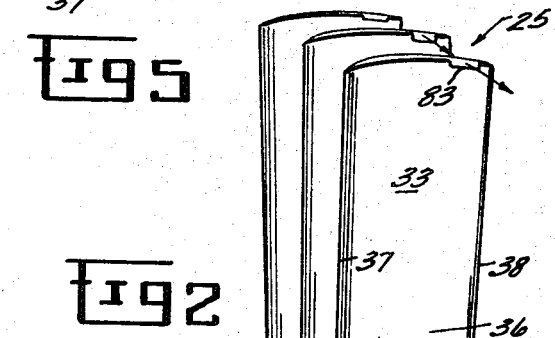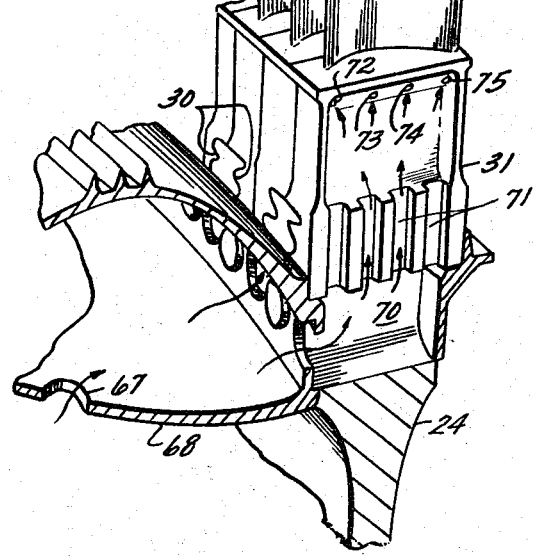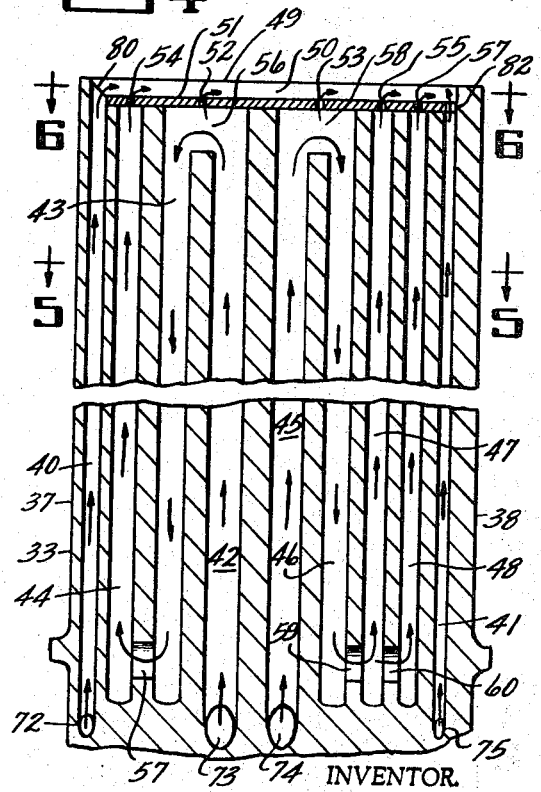

3,533,712
COOLED VANE STRUCTURE FOR HIGH TEMPERATURE TURBINES
David M. Kercher, Cincinnati, Ohio, assignor to General Electric Company, a corporation of New York
Filed Feb. 26, 1966, Ser. No. 533,119
Int. Cl. F01d 5/08
U.S. Cl. 416—92         10 Claims

ABSTRACT OF THE DISCLOSURE

In an axial flow turbomachine, a vane having a plurality of internal spanwise passages for the flow of a cooling fluid, the passages being dimensioned and interconnected such that the vane is maintained at a substantially uniform temperature during turbomachine operation.

---

This invention relates to cooled blading for high temperature turbomachines and, more particularly, a turbine vane construction having improved means for controlling and directing the flow of a cooling fluid through the interior of the vane.

It is well known that the efficiency of a gas turbine engine is related to the operating temperature of the turbine and that the efficiency may be increased, in theory, by increasing the operating temperature. As a practical matter, however, the maximum turbine operating temperature is limited by the high temperature capabilities of the various turbine elements. Since the engine efficiency is thus limited by temperature considerations, turbine designers have expended considerable effort toward increasing the high temperature capabilities of turbine elements, particularly the airfoil shaped vanes upon which high temperature combustion products impinge. Some increase in engine efficiency has been obtained by the development and use of new materials capable of withstanding higher temperatures. These new materials are not, however, generally capable of withstanding the extremely high temperatures desired in modern gas turbines. Consequently, various cooling arrangements for vanes have been devised for extending the upper operating temperature limit by keeping the vane material at the lower temperatures which is capable of withstanding without pitting or burning out. As used herein, the term "vane" is a generic term referring to airfoil-shaped elements used in high temperature turbomachines. As such, the term applies not only to those members popularly known as vanes, but also to other airfoil shaped members commonly known as blades, buckets, etc. In fact, the present invention is illustrated herein in conjunction with the airfoil shaped vanes of a turbine rotor; such vanes are often called buckets.

Cooling of vanes is generally accomplished by providing internal flow passages within the vanes to accommodate the flow of a cooling fluid, the fluid typically being compressed air bled from either the compressor or the combustor. It is also well known that the engine efficiency theoretically possible is reduced by the extraction of cooling air. It is therefore imperative that cooling air be utilized effectively, lest the decrease in efficiency caused by the extraction of the air be greater than the increase resulting from the higher turbine operating temperature. In other words, the cooling system must be efficient from the standpoint of minimizing the quantity of cooling air required. It is also essential that all portions of the turbine vanes be cooled adequately. In particular, adequate cooling must be provided for the leading and trailing edges of the vanes, these portions being most adversely affected by the high temperature combustion gases.

It has been found that cooling configurations available in the past have tended to have deficiencies with respect to the foregoing requirements. Cooling systems which use minimum quantities of cooling air commonly fail to cool adequately all portions of the vane. As a result, a critical portion such as the leading edge may crack, burn out, or pit after a relatively short operating period. On the other hand, those systems which adequately cool all portions of the vane, including the leading and trailing edges, commonly require too much air for efficient overall engine performance, the reason being that the cooling air is not used efficiently. For example, an inefficient arrangement may direct the cooling air through the interior of the vane in a manner which results in the creation of low convection heat transfer coefficients, or rates of heat transfer. Other characteristics, such as inadequate heat transfer area, can also prevent effective use of the cooling air.

It is therefore an object of this invention to provide for high temperature turbomachines an improved vane structure by which cooling fluid is utilized in a highly efficient manner.

It is another object of this invention to provide for high temperature turbomachines an improved vane structure by which all portions of the vane are cooled adequately.

A further object of this invention is to provide for high temperature turbines an improved vane arrangement which is relatively simple and inexpensive to manufacture and sturdy, lightweight, and reliable in operation.

Briefly stated, in carrying out the invention in one form, a vane for use in a high temperature turbomachine has a plurality of axially spaced cooling fluid passages formed therein, these passages including a radial passage adjacent the leading edge of the vane, a radial passage adjacent the trailing edge of the vane, and at least one serpentine passage between the leading and trailing edge passages. Each of the passages has had independent inlet means for supplying cooling fluid, such as air, thereto and independent outlet means. In other words, separate and distinct cooling flow passages are provided for cooling the midchord region and the most critical regions, the leading and trailing regions. The cooling fluid in the serpentine passage does more, however than merely cool the midchord region of the vane; it also depresses the temperature of the boundary layer in the midchord region. Because of this temperature depression in the boundary layer, which flows generally along the vane walls from the midchord region to the trailing edge region, the cooling load at the trailing edge is reduced. In other words, the cooling fluid in the serpentine passage actually helps cool the trailing edge.

By a further aspect of the invention, the serpentine passage, which is preferably formed of a plurality of interconnected radial passages has a cross sectional area which decreases between its inlet and outlet means such that the convection heat transfer coefficients generated by the cooling fluid as it flows through the serpentine passage increase between the inlet and outlet means. By arranging the passes of the serpentine passage such that the maximum cross sectional flow area is substantially midway between the leading and trailing edges, where the vane is thickest, and the minimum cross sectional area is closer to either the leading or trailing edge, or both, two important advantages may be attained, these being that chordwise temperature gradients and vane weight are reduced significantly. By a still further aspect of the invention, the separate outlet means for the independent passages are openings sized to throttle flow therethrough so as to thereby control the amounts of cooling fluid flowing through the passages. As a result, the rate of cooling fluid flow may be held at a minimum level consistent with adequate cooling, and the cooling passages may be manufactured with relatively large cross sectional flow areas. When used in rotor assemblies, the vane may be provided with bleed openings for rejection of foreign matter so that the serpentine passage will not become fouled with foreign matter.

While the novel features of this invention are set forth with particularity in the appended claims, the invention, both as to organization and content, will be better understood and appreciated, along with other objects and features thereof, from the following detailed description taken in conjunction with the drawing in which:

FIG. 1 is a sectional view of a portion of a gas turbine engine having a turbine rotor assembly incorporating the present invention;

FIG. 2 is a pictorial view of a portion of the rotor assembly of FIG. 1;

FIG. 3 is a pictorial view, partly in section of one of the vanes, or buckets, of the rotor assembly;

FIG. 4 is a cross sectional view, in enlarged scale, of one of the vanes, or buckets, of the rotor assembly;

FIG. 5 is a view taken along viewing line 5—5 of FIG. 4; and

FIG. 6 is a view taken along viewing line 6—6 of FIG. 4.

Referring to the drawings, and particularly to FIG. 1, the high temperature portions of an axial flow gas turbine engine 10 are illustrated, the engine having an outer cylindrical casing 11 circumferentially surrounding the high temperature portions. The illustrated gas turbine structure includes an annular combustion space indicated generally by 12, the combustion space 12 being formed between the cylindrical casing 11 and an inner wall 13. An annular combustion liner 14 is located within the space 12 in spaced relation to the casing 11 and the wall 13, the actual combustion occurring within the annular combustion liner 14. The annular spaces 15 and 16 between the combustion liner 14 and the casing 11 and the wall 13 are filled with high pressure air discharged by the compressor (not shown). This high pressure air, which is quite cool relative to the high temperature combustion gases within the combustion liner 14, is admitted in a controlled manner to the interior of the combustion liner to support combustion and provide cooling therein. In accordance with the present invention, this relatively cool air may also be used for cooling certain turbine elements exposed to the high temperature combustion products.

An annular nozzle diaphragm indicated generally by 20 in FIG. 1 is located at the downstream end of the combustion liner 14 for supplying the hot products of combustion to a row of turbine buckets 21 at the proper velocity and at the proper angle. The turbine buckets 21 are peripherally mounted on a turbine wheel 22 which, along with its associated shaft 23 and a second turbine wheel 24 having buckets 25 mounted thereon, is rotatably mounted on the engine axis 26 by suitable mounting means including a bearing arrangement 27. The turbine unit comprising the wheels 22 and 24, and the shaft 23 drives the compressor (not shown) of the engine 10.

With reference now directed to FIGS. 1 and 2, it will be noted that the entire flow of combustion products passes through the annular nozzle diaphragms 20 and 28 and over the rows of turbine buckets 21 and 25. If the gas turbine engine 10 is to operate at the efficiency and power levels desired in modern gas turbine engines, the combustion products must be discharged from the combustion liner 14 at temperatures higher than those which can be withstood without cooling by vanes made of currently available materials. The present invention makes this desired efficiency possible by providing adequate cooling in a highly efficient manner for all vane portions. In the illustrated embodiment, the cooling arrangement of the invention is applied only to the turbine buckets 25, but it will become clear as this description proceeds that the invention could be utilized in conjunction with blading other than turbine buckets, such as the airfoil shaped vanes comprising the turbine nozzle diaphragms 20 and 28.

Before turning attention to the precise manner by which the present invention controls and directs the flow of cooling fluid through the interior and over the exterior surfaces of the turbine buckets 25 it will be well to describe briefly the general arrangement and construction of the turbine rotor assembly. Specifically, the rotor wheel 24 has a plurality of circumferentially spaced slots 30 in its outer periphery, the turbine buckets 25 having base portions 31 received in the slots 30. A vane body 33 is integrally formed with each base portion 31 and extends radially outwardly therefrom, the vane body 33 being the portion of the turbine bucket 25 actually subjected to the high temperature combustion products.

The vane body 33 of each turbine bucket is an airfoil shaped member having an exterior convex side wall surface 35 and an exterior concave side wall surface 36 interconnecting axially spaced leading and trailing edges 37 and 38, respectively. As best shown by FIGS. 5 and 6, the aerodynamic shape of the vane body 33 at the leading edge 37 is rounded and rather blunt while the trailing edge region is tapered and quite thin. To cool these critical leading and trailing edge regions, as well as the mid-chord region, in accordance with the present invention, each vane body 33 is formed with heat exchange passages therein as illustrated by FIGS. 4–6. More particularly, the vane body 33 has a plurality of axially spaced passages formed therein, the passages including a radial passage 40 adjacent the leading edge 37, a radial passage 41 adjacent the trailing edge 38, a first serpentine passage comprising axially spaced, radial passages 42, 43, and 44, and a second serpentine passage comprising axially spaced, radial passages 45, 46, 47 and 48. As best shown by FIGS. 4–6, the passages 40–48 are radial holes extending inwardly from the radially outer end 49 of the vane body 33 to the base portion 31, a recess or plenum 50 being formed by the convex and concave side wall surfaces 35 and 36 extending radially outwardly the outer end 50. The outer end 49 of the vane body 33 includes an end wall 51 which closes, except for bleed openings 52 and 53 metering openings 54, 55 and 57 the outer ends of the passages 42–48.

As illustrated by FIG. 4, the radial passages 42 and 43 are axially interconnected by an opening 56 at their radially outer ends adjacent the end wall 51 and the passages 43 and 44 are axially interconnected by an opening 57 at their inner ends adjacent the base portion 31, the passages 42–44 thus forming the first serpentine passage. Similarly, the passages 45 and 46 are axially interconnected by an opening 58 at their radially outer ends adjacent the end wall 51 and the passages 46, 47 and 48 are axially interconnected by openings 59 and 60 at their inner ends to form the second serpentine passage.

While referring to the first and second serpentine passages, it should be noted that the radial passage 42 is of larger cross sectional area than the passage 43, which in turn is of greater diameter than the passage 44. Similarly, the passage 45 has greater cross sectional area than the passage 46, and the passage 46 has greater flow area than the passage 47. The particular manner by which this arrangement of flow areas contributes to cooling effectiveness will become apparent as this description proceeds. At this point, however, it will be obvious to those skilled in the art that this arrangement also provides a lightweight and uniformly strong vane structure since the maximum amount of material is removed in the thickest region of the vane body.

The cooling fluid for cooling the turbine buckets 25 is relatively cool compressed air bled from the combustion space 16 through circumferentially spaced openings 65 in the inner wall 13 as illustrated by the arrows of FIG. 1. From the openings 65, the air flows through circumferentially spaced openings 66 in the rotor shaft 23, from which it flows axially downstream to the aft side of the rotor wheel 22 where it flows outwardly through openings 67 in a ring member 68 interconnecting the turbine rotor wheels 22 and 24. The cool air then enters a plenum region 70 radially inward of the base portion 31, from which it flows radially outward through grooves 71 to inlet openings 72, 73, 74 and 75 communicating with the radial passages 40, 42, 45 and 41, respectively. In this manner, cooling air is admitted to the interior of the vane body 33.

In accordance with the present invention, outlet means are also provided for discharging cooling fluid from the vane body 33. The outlet means includes an outlet opening 80 through which cooling fluid is discharge to the plenum 50 from the leading edge passage 40 and an outlet opening 82 through which cooling fluid is discharge to the plenum 50 from the trailing edge passage 41. These openings 80 and 82 are sized to throttle flow therethrough for the purpose of controlling the amount of cooling fluid flowing through the passages 40 and 41. The outlet means also includes the metering or throttling openings 54, 55 and 57 in the end wall 51, the purpose of these openings being to control the amounts of cooling fluid flowing through the serpentine passages and discharged therefrom to the plenum 50. Finally, the outlet means includes a notch 83 in the concave side wall 36 adjacent the trailing edge 38 for permitting cooling fluid to escape from the plenum 50 into the main stream of hot combustion gases.

In operation, relatively cool high presure air from the combustion space 16 is admitted through the inlet openings 72, 73, 74 and 75 in the base portion 31 to the radial passages 40, 42, 45 and 41 respectively. The cooling air thus introduced into the leading edge passage 40 flows outwardly through the passage and is discharged through the opening 80. Similarly, the cooling fluid flowing through the trailing edge passage 41 is discharged to the plenum 50 through the opening 82.

The cooling fluid in the first serpentine passage flows radially outward through passage 42, then radially inward through passage 43, and then radially outward through the passage 44 from which it is discharged through the throttling opening 54 to the plenum 50. Similarly, the cooling fluid in the second serpentine passage flows radially outward through the passage 45, then radially inward through the passage 46, and then radially outward through the passages 47 and 48 from which it is discharged through the throttling openings 55 and 57 to the plenum 50.

The structural arrangement just described provides an adequate and extremely efficient cooling system. For example, at the leading edge region where cooling problems have heretofore been most acute, the present invention provides very effective convection cooling. Since the leading edge passage 40 has independent inlet and outlet openings 72 and 80, the cooling air flowing therethrough is quite cool since it has not been subjected to previous cooling chores. This cooling arrangement is also efficient since the outlet opening 80 is sized to permit sufficient, but not excessive, flow of cooling fluid through the leading edge passage 40. The critical trailing edge region is cooled in a similar manner, a stream of cooling air making a single pass through the trailing edge passage 41 and then being discharged to the plenum 50 through the metering opening 82 which is sized to provide minimum flow consistent with adequate trailing edge cooling.

The cooling arrangement of the present invention also provides extremely effective cooling in the midchord region of the vane body 33. More particularly, the midchord region is convection cooled by cooling fluid flowing the entire radial length of the vane body 33 through the passages 42–48, all of the fluid traversing the length of the vane body three times. As noted above the cross sectional flow area of the first serpentine passage decreases between its inlet opening 73 and its outlet opening 54, and the cross sectional flow area of the second serpentine passage decreases between its inlet opening 74 and its outlet openings 55 and 57. Because of this decrease in flow area, the cooling air is accelerated and higher heat transfer coefficients are generated by the cooling air as it flows through the serpentine passages. At the same time, however, the cooling fluid is warmed as it flows through the serpentine passages. The increase in the rate of heat transfer caused by the higher heat transfer coefficients and the decrease in the rate of heat transfer caused by warming of the fluid tend to cancel one another, the net result being substantially uniform heat transfer throughout the midchord region and minimum temperature gradients in the vane body 33. As in the case of the leading and trailing edge passages 40 and 41, the serpentine passages have adequate, but not excessive, amounts of cooling air flowing therethrough, the amounts being controlled by the throttling openings 54, 55 and 57.

The cooling fluid in the first and second serpentine passages does more, however, than merely convection cool the midchord region of the vane body 33; it also extracts a substantial amount of heat from the boundary layer of slowly moving combustion products which exists on the external convex and concave side wall surfaces 35 and 36 in the midchord region. The result is a depression in the temperature of the boundary layer in the midchord region. Because of this temperature depression in the boundary layer gases flowing from the midchord region to the trailing edge region, the cooling load at the trailing edge is actually reduced since the trailing edge is thus exposed to lower temperature gases. In other words, the cooling fluid in the first and second serpentine passages actually helps cool the trailing edge.

The cooling arrangement of the present invention also provides adequate convection cooling of the outer end wall 51 by the cooling fluid flowing through the opening 56 between the radial passages 42 and 43 and the opening 58 between the radial passages 45 and 46. As indicated previously, bleed openings 52 and 53 are provided in the end wall 51, the openings 52 and 53 communicating with the openings 56 and 58 of the serpentine passages. The purpose of these bleed openings 52 and 53 are to permit small particles of foreign matter to escape from the serpentine passages. If the bleed openings 52 and 53 were not provided, centrifugal force would cause such particles to pile up in the openings 56 and 58, the eventual result being blockage of the serpentine passages and failure of the cooling system. These bleed openings 52 and 53 are sized such that only a very small portion of the total cooling air flow escapes through the end wall 51 with the foreign matter. The small percentage of air which does pass through the openings is discharged into the plenum 50 at the outer end 49 of the vane, from which it then reenters the main stream of hot combustion gases through the notch 83 along with the main body of cooling fluid.

It has been noted above that a lightweight and sturdy vane construction is provided by locating the maximum diameter passages 42 and 45 substantially midway between the leading and trailing edges, where the vane body 33 is thickest, and by locating the minimum diameter passages 44 and 48 adjacent the leading and trailing edge passages 40 and 41, respectively. The use of the metering openings 54, 55, 57, 80 and 82 also contribute to a lightweight construction since all of the passages 40–48 may be made of greater diameter than would be possible in the event that the diameters of the passages were relied upon to limit flow.

As pointed out above, the cooling arrangement of this invention is not limited to use in turbine buckets; it may of course be applied with equal utility to nozzle diaphragms for gas turbine engines and to vanes utilized in other high temperature turbomachines, such as high pressure compressors. It will also be obvious to those skilled in the art of the general arrangement of this invention may be used if desired for related purposes, such as for anti-icing compresor vanes. It will also be obvious that the invention may be used in vanes formed differently than that of the illustrated turbine buckets 25 having drilled passages.

It will thus be seen that a vane structure constructed in accordance with this invention utilizes substantially the minimum amount of cooling fluid consistent with adequate cooling of all vane portions. In addition, the resultant vane is relatively simple and is lightweight, sturdy, and reliable in operation.

It will be understood that the invention is not limited to the specific details of the construction and arrangement of the particular embodiments illustrated and described herein. It is therefore intended to cover in the appended claims all such changes and modifications which may occur to those skilled in the art without departing from the true spirit and scope of the invention.

What is claimed as new and is desired to be secured by Letters Patent of the United States is:

1. In an axial flow turbomachine, a vane comprising:
    a radially extending vane body having radially spaced inner and outer ends and exterior wall surfaces including convex and concave side wall surfaces interconnecting axially spaced leading and trailing edges,
    interior wall means forming a passage adjacent the leading edge extending radially between said inner and outer ends, a passage adjacent the trailing edge extending radially between said inner and outer ends, and at least one serpentine passage intermediate said leading and trailing edge passages extending radially between said inner and outer ends,
    first inlet means at one end of said vane body for admitting heat transfer fluid to said leading edge passage and first outlet means at the other end of said vane body for discharging heat transfer from said leading edge passage.
    second inlet means at one end of said vane body for admitting heat transfer fluid to said trailing edge passage and second outlet means at the other end of said vane body for discharging heat transfer fluid from said trailing edge passage,
    and third inlet means at an end of said vane body for admitting transfer fluid to said serpentine passage and third outlet means at an end of said vane body for discharging heat transfer fluid from said serpentine passage, the cross-sectional flow area of said serpentine passage decreasing between said third inlet means and said third outlet means such that the convection heat transfer coefficients generated by heat transfer fluid flowing through said serpentine passage increase between said third inlet means and said third outlet means,
    whereby said vane is maintained at a substantially uniform temperature.

2. A vane as defined by claim 1 in which said first, second, and third outlet means are openings sized to throttle flow therethrough and thereby control the relative amounts of heat transfer fluid flowing through said respective leading edge, trailing edge, and serpentine passages.

3. A vane as defined by claim 2 in which said vane body has at least one bleed opening therein communicating with said serpentine passage intermediate said third inlet means and said third outlet opening to permit the ejection of foreign matter therethrough, the cross sectional area of said bleed opening being substantially less than the cross sectional area of said third outlet opening.

4. In a high temperature axial flow turbine, a rotor assembly comprising:
    a rotor wheel,
    a plurality of circumferentially spaced, radially extending vanes peripherally mounted on said rotor wheel,
    each of said vanes including a base portion engaging said rotor wheel and an airfoil shaped vane body extending radially outward from said base portion,
    said vane body having an outer end and exterior wall surfaces including convex and concave side wall surfaces interconnecting axially spaced leading and trailing edges,
    interior wall surfaces forming a passage adjacent the leading edge extending radially between said base portion and said outer end, a passage adjacent the trailing edge extending radially between said base portion and said outer end, a first serpentine passage adjacent said leading edge passage, and a second serpentine passage adjacent said trailing edge passage,
    first inlet means in said base portion for admitting cooling fluid to said leading edge passage and a first outlet opening at said outer end for discharging cooling fluid from said leading edge passage,
    second inlet means in said base portion for admitting cooling fluid to said trailing edge passage and a second outlet opening at said outer end for discharging cooling fluid from said trailing edge passage,
    third inlet means in said base portion for admitting cooling fluid to said first serpentine passage and a third outlet opening at said outer end for discharging cooling fluid from said first serpentine passage,
    and fourth inlet means in said base portion for admitting cooling fluid to said second serpentine passage and a fourth outlet opening at said outer end for discharging cooling fluid from said second serpentine passage,
    whereby said vane is cooled in a substantially uniform manner.

5. A rotor assembly as defined by claim 4 in which each of said first and second serpentine passages is comprised of a plurality of axially spaced passages each extending radially between said base portion and said outer end, the radial passages of each of said serpentine passages being axially interconnected at radial ends thereof such that cooling fluid flowing through each of said serpentine passages traverses substantially the entire length of said vane body at least three times.

6. A rotor assembly as defined by claim 5 in which the cross sectional areas of the radial passages directly communicating with said third and fourth inlet means are greater than the cross sectional areas of the radial passages directly communicating with said third and fourth outlet openings, respectively, such that the convection heat transfer coefficients generated by cooling fluid flowing through said serpentine passages increase between said inlet means and said outlet openings.

7. A rotor assembly as defined by claim 6 in which said first, second, third, and fourth outlet openings are sized to throttle flow therethrough and thereby control the relative amounts of cooling fluid flowing through said leading edge, trailing edge, and said first and second serpentine passages.

8. A rotor assembly as defined by claim 7 in which the radial passages comprising said first and second serpentine passages are disposed with the passages of maximum cross sectional area located adjacent each other substantially midway between said leading and trailing edges where the distance between said convex and concave side wall surfaces is greatest and the passages of minimum cross sectional area located adjacent said leading edge and said trailing edge passages, respectively, such that chordwise temperature gradients and vane weight are minimized.

9. A rotor assembly as defined by claim 8 including at least one bleed opening at said outer end communicating with said first serpentine passage intermediate said third inlet means and said third outlet opening and at least one bleed opening at said outer end communicating with said second serpentine passage intermediate said fourth inlet means and said fourth outlet opening, the cross sectional areas of said bleed openings being substantially less than the cross sectional areas of said third and fourth outlet openings.

10. A rotor assembly as defined by claim 9 in which said convex and concave side wall surfaces of said vane body project radially beyond said outer end to form with said outer end a plenum into which cooling fluid is discharged from said outlet openings and said bleed openings, said concave side wall surface having a notch therein adjacent the trailing edge to permit flow of cooling fluid therethrough from said plenum.

References Cited

"A Review of Blade-Cooling Systems," Part 2—Designs Considerations, by R. I. Hodge and I. H. Johnston, The Oil Engine and Gas Turbine, February 1958, pages 396, 397 and 398.

SAMUEL FEINBERG, Primary Examiner

U.S. Cl. X.R.

416—97